W. J. BAYRER, DEC'D.
H. H. BAYRER BEING ADMINISTRATOR.
SUPPORTING MEANS FOR SHAFT BEARINGS.
APPLICATION FILED SEPT. 18, 1919.
1,416,776.
Patented May 23, 1922.
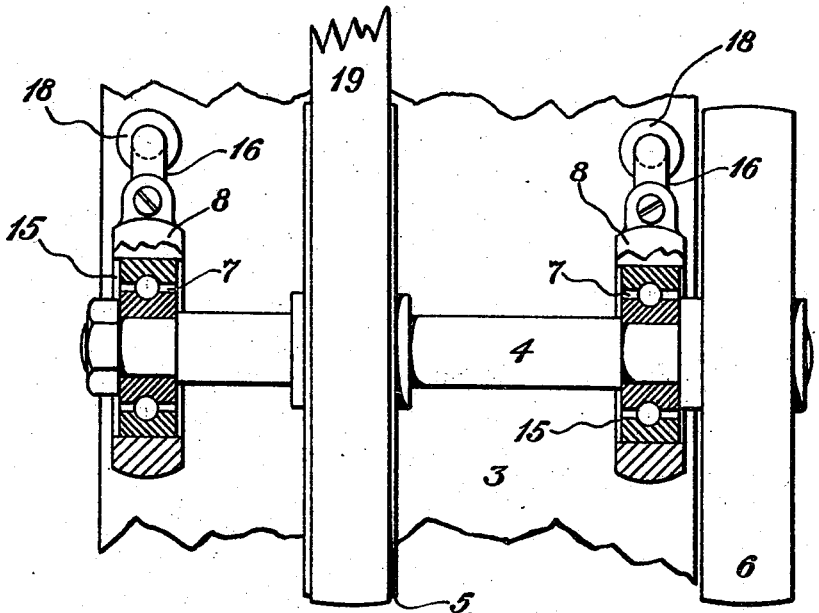
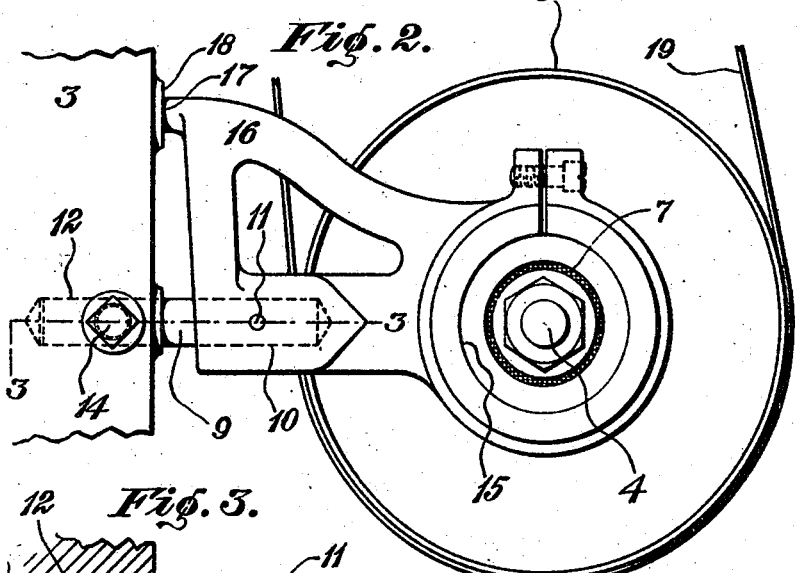
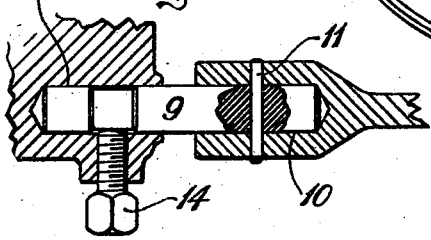
Inventor:
William J. Bayrer
By his Attorney,
F. E. Anderson

UNITED STATES PATENT OFFICE.

WILLIAM J. BAYRER, OF HARTFORD, CONNECTICUT; HOMER H. BAYRER, BEING ADMINISTRATOR OF SAID WILLIAM J. BAYRER, DECEASED, ASSIGNOR TO ROBERT G. HENRY, OF WEST HARTFORD, CONNECTICUT.

SUPPORTING MEANS FOR SHAFT BEARINGS.

1,416,776.   Specification of Letters Patent.   Patented May 23, 1922.

Application filed September 18, 1919. Serial No. 324,629.

*To all whom it may concern:*

Be it known that I, WILLIAM J. BAYRER, a citizen of the United States, residing in the city of Hartford, county of Hartford, and State of Connecticut, have invented certain new and useful Improvements in Supporting Means for Shaft Bearings; and I do declare the following to be a full, clear, and exact description of the same, reference being had to the accompanying drawings, forming a part of this specification, and to the characters of reference marked thereon.

This invention relates to supporting means for shaft bearings and particularly to supports for bearings of which precise alignment is of especial importance as in an arrangement wherein a shaft is supported at separated points by respective sets of balls retained in annular races.

The object of the invention is the provision of a simple and inexpensive construction adapted to permit of self adjustment of certain elements into an alignment derived from a shaft extending therethrough. To this end the invention consists of brackets of novel form and means for associating them with their support in a manner to facilitate precise alignment thereof and to afford effective resistance to a load laterally transmitted from a shaft carried thereby.

In the drawings which illustrate one convenient form of embodiment of the invention,—

Figure 1, is a side view of a shaft carrying driven and driving elements and supported in brackets embodying my invention, certain parts being shown in section.

Figure 2, is an end view of the parts shown in Fig. 1.

Figure 3, is a sectional view on line 3—3 of Fig. 2.

Referring to the drawings, the numeral 3 designates a machine base, as that of a drilling machine where for example it may be assumed that a shaft as 4, is to be supported for carrying the pulleys 5 and 6, which respectively constitute driven and driving elements. For receiving the shaft, ball bearings as 7, are provided at separated points and these bearings are carried in suitable brackets 8. Each bracket is provided with a stud 9, fitted in a socket 10, and held by a pin 11. To receive and support these studs the machine base is provided with sockets 12, precisely drilled with their longitudinal axes in exact parallelism, so that the studs may be located in like relation and securely held by set screws 14. To receive its respective stud, the socket with which each bracket is provided is formed radially to the opening 15, therein which receives one of the annular bearings 7. With the studs 9, serving as pivots and extending in parallelism in a given plane, which in the present case is horizontal, it will be apparent that the brackets may be turned into a parallel relation with each other, or in other words, into a relation wherein the longitudinal axes of their respective bearings 7, are in parallelism, and these axes may then be made to coincide by exactly locating the brackets in the lengthwise direction of the supporting studs. The latter adjustment may be determined by contact of a finished surface on each bracket with a finished surface on the machine frame or support for the brackets. For thus engaging its support, I prefer to provide each bracket with an arm 16, having a finished surface 17, to engage a finished surface 18, on the machine base or support 3. Such an arm serves a further purpose in providing at a point remote from the supporting stud an effective resistance to a load transmitted laterally from the shaft, as by the pull of a belt 19, driven by the pulley 5. It will be clear that a proper location of the studs 9, and a proper location of the brackets in the lengthwise direction of the studs is obtained by careful, although simple machining of the associated parts. The final adjustment of the brackets into exact alignment may involve rotation of either one or both with its respective stud acting as a pivot, the operation being simply accomplished by placing the bearings 7 upon the shaft and introducing them into the openings 15, in their respective brackets. Obviously this will locate the brackets in true alignment with that of the shaft and when thus located the brackets may be firmly secured in precise adjustment by engaging the set screws 14 with the studs 9.

While the illustration of my invention as herein set forth is a specific embodiment thereof, and the terms describing it are specific, it is to be understood that the form and arrangement of the parts and the application of the principles involved may be considerably varied without departure from the scope of the invention as defined by the appended claims.

Having thus described my invention, what I claim is,—

1. In combination, a support, a bracket having an opening to receive a bearing, a stud associated with the bracket and adapted for endwise and rotary adjustment in a socket for the support, a projection on the bracket adapted to engage the support to locate the bracket in the lengthwise direction of the stud, and means for securing the stud in the support to hold the bracket in alignment with a predetermined alignment of a shaft bearing extending thereinto.

2. In combination, a support, a bracket having an opening to receive a bearing, a stud associated with the bracket and the support and forming a pivot about the axis of which the bracket may be adjusted, means remote from the stud for locating the bracket in the lengthwise direction of the stud and for resisting pressure transmitted from the bearing, and means for holding the stud in the bracket and support.

3. In combination, a support, a bracket having an opening to receive a bearing, means for securing the bracket to the support including a stud extending radially from the opening in the bracket and about the axis of which the bracket is pivotally adjustable to align the bracket with a predetermined alignment of the bearing, and means on the bracket remote from the stud to engage the support to effect location of the bracket and to resist a load applied to the bracket.

4. In combination, a shaft, bearings for the shaft, a plurality of brackets each having an opening to receive one of the bearings, a support, a stud with its axis at right angles to the shaft for associating each bracket with the support and serving as a pivot whereby the brackets may be turned into an alignment defined by the shaft and the bearings, and means on each bracket remote from its stud to engage the support.

5. In combination, a support, a bracket, means for uniting the bracket and the support comprising a stud secured in a socket in one of the members and adapted to be adjustably held in a socket in the other member whereby the bracket may be adjusted rotatively about the axis of the stud and bodily in the direction of extent of said axis and means on the bracket remote from the stud to engage the support.

WILLIAM J. BAYRER.